United States Patent [19]

Murao

[11] Patent Number: 4,716,981
[45] Date of Patent: Jan. 5, 1988

[54] APPARATUS FOR STEERING FRONT AND REAR WHEELS OF A MOTOR VEHICLE

[75] Inventor: Eiji Murao, Saitama, Japan

[73] Assignee: Honda Giken Kogyo Kabushiki Kaisha, Tokyo, Japan

[21] Appl. No.: 12,846

[22] Filed: Feb. 10, 1987

[30] Foreign Application Priority Data

Feb. 12, 1986 [JP] Japan ................................. 61-29544
Feb. 12, 1986 [JP] Japan ................................. 61-29546
Feb. 12, 1986 [JP] Japan ................................. 61-29547
Feb. 12, 1986 [JP] Japan ................................. 61-29548

[51] Int. Cl.$^4$ ............................................. B62D 5/04
[52] U.S. Cl. ................................... 180/79.1; 180/140
[58] Field of Search ...................... 180/79.1, 140, 142; 364/424; 280/91

[56] References Cited

U.S. PATENT DOCUMENTS 4,621,327 11/1986 Dolph et al. ...................... 180/79.1
4,657,102 4/1987 Kanazawa et al. .................. 180/140

FOREIGN PATENT DOCUMENTS

2044699 10/1980 United Kingdom .

Primary Examiner—John A. Pekar
Attorney, Agent, or Firm—Irving M. Weiner; Joseph P. Carrier; Pamela S. Burt

[57] ABSTRACT

An apparatus for steering the front and rear wheels of a motor vehicle includes a detector for detecting an effect of operation by a driver of the motor vehicle on the behavior of the motor vehicle, and a rear wheel steering control device for returning the rear wheels to a neutral steering position when a rate of change of a detected output from said detecting means is in excess of a prescribed value. The apparatus may further include another control device for variably controlling the ratio of a rear wheel steering angle to a front wheel steering angle according to a speed of the motor vehicle. The detector comprises a steering angle sensor for detecting a steering angle of the front wheels or a speed sensor for detecting the speed of travel of the motor vehicle. The rate of change of the detected output is calculated by said rear wheel steering control device from time-series steering angle data or speed data produced from information generated by said steering angle or speed sensor. The prescribed value to be compared with the rate of change of the steering angle output is substantially the same as a maximum rate of change of a steering angle which can be produced during steering operation of the motor vehicle. The prescribed value to be compared with the rate of change of the speed output is substantially the same as a maximum rate of change of a speed of the motor vehicle which can be produced upon deceleration of the motor vehicle.

8 Claims, 7 Drawing Figures

PRIOR ART

FIG.7

APPARATUS FOR STEERING FRONT AND REAR WHEELS OF A MOTOR VEHICLE

BACKGROUND OF THE INVENTION

1. Field of the Invention

The present invention relates to an apparatus for steering the front and rear wheels of a motor vehicle such as an automobile, and more particularly to an improvement in a rear wheel control means in such a front and rear wheel steering apparatus.

2. Description of the Relevant Art

There is known an apparatus for steering the front and rear wheels of a motor vehicle while the ratio of a rear wheel steering angle to a front wheel steering angle is being variably controlled, as disclosed in British Pat. No. 2,044,699. In the known steering apparatus, when the motor vehicle runs at a low speed, the rear and front wheels are steered in opposite directions, thus allowing the motor vehicle to make a small radius turn. When the motor vehicle travels at a high speed, the rear and front wheels are steered in the same direction to make the motor vehicle highly maneuverable.

The conventional front and rear wheel steering apparatus of the type described has a speed sensor for detecting the speed of the motor vehicle, a steering angle sensor for detecting the steering angle of the front wheels, a control unit, and a drive motor for steering the rear wheels. The control unit is responsive to data of the vehicle speed and the front wheel steering angle, as detected by the sensors, for determining an optimum value for the rear wheel steering angle and controlling the drive motor so that the rear wheels will be steered through the determined optimum steering angle.

Figure 6:
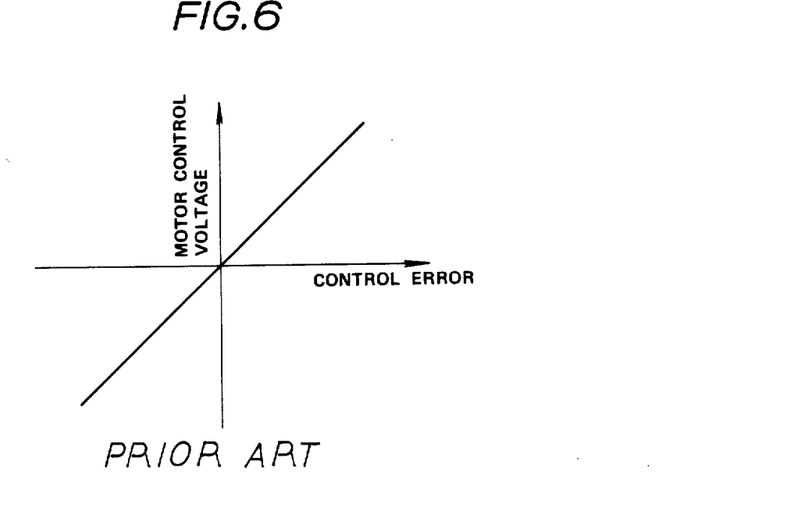
FIG. 6 is a graph showing the conventional relationship between a motor control voltage and a control error.

More specifically, the drive motor for steering the rear wheels is controlled by applying a control voltage proportional to the difference (hereinafter referred to as a "control error") between a target steering angle value and a present rear wheel steering angle (hereinafter referred to as a "present value"), to the motor, and reducing the motor control voltage as the control error decreases until the control error is eliminated, whereupon the motor control voltage applied to the motor becomes zero and the rear wheel steering angle reaches the target value. The above control system is known as a proportional control system since the ratio of the motor control voltage to the control error is constant as shown in FIG. 6 of the accompanying drawings. This proportional control system has been employed in conventional front and rear wheel steering apparatus.

As described above, the motor vehicle with steerable front and rear wheels has various detectors such as a steering angle sensor and a speed sensor for detecting the effects of driving operations of the driver on the behavior of the motor vehicle. Specifically, the steering angle sensor is employed to detect the amount and direction of steering as a result of turning the steering wheel, and the speed sensor is employed to detecting the speed of the motor vehicle as a result of operation of the accelerator pedal or brake pedal.

The conventional front and rear wheel steering apparatus has the following problems since the control system thereof is a simple combination of the detecting means and the control unit.

Figure 7:
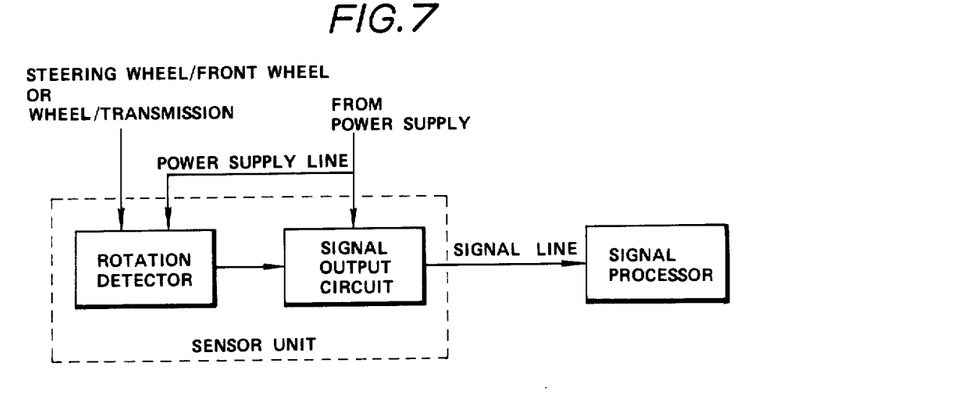
FIG. 7 is a block diagram of a system arrangement of a detecting means according to the present invention.

As shown in FIG. 7 of the accompanying drawings, the detecting means includes a sensor unit comprising a rotation detector and a signal output circuit which are connected to a power supply via power lines. Where the detecting means is a steering angle sensor unit, the rotation detector detects a steering angle from the steering wheel or a front wheel. Where the detecting means is a speed sensor unit, the rotation detector detects a motor vehicle speed from a wheel or a transmission. The signal output circuit receives a signal from the rotation detector and applies the detected signal over a signal line to the control unit in which the signal is processed.

The system arrangement shown in FIG. 7 suffers from the following possible failures:

(i) Failure of the rotation detector;
(ii) Failure of the signal output circuit;
(iii) Failure of the power supply and/or the power supply line; and
(iv) Failure of the signal line.

In a case where the steering angle sensor unit is used as the detecting means, steering angle data produced at the time of a failure thereof is constant or remains unchanged as observed from the control unit or signal processor. The steering angle data is also constant or remains unchanged when the steering wheel is kept at a certain angle. Therefore, it would be impossible to ascertain whether the steering angle sensor unit is functioning or not, dependent on whether the steering angle is changed or not. Where the speed sensor unit is employed as the detecting means, a constant voltage is present on the signal line with no pulse signal produced in the event of a failure thereof, as observed from the signal processor. The voltage on the signal line also remains constant and no pulse signal is issued when the motor vehicle is at rest. As a result, it would not be possible to tell whether the speed sensor unit is functioning well or not on the basis of whether there is a pulse signal or not on the signal line.

In the event that the speed of the motor vehicle with the above front and rear wheel steering apparatus is abruptly reduced by the driver while the motor vehicle is being steered, the steering angle of the rear wheels is also abruptly varied as a function of the abrupt change in the motor vehicle speed, thus undesirably causing the running direction of the motor vehicle to vary significantly.

Moreover, because of the proportional control system employed, the conventional front and rear wheel steering apparatus has the following drawbacks:

(i) If a proportionality coefficient (i.e., the ratio of the motor control voltage to the control error) is increased in order to increase a control speed (i.e., to shorten a control delay time), then hunting occurs in a range in which the control error is small;

(ii) Conversely, if the coefficient is reduced in order to prevent such hunting, the control speed is lowered inasmuch as the motor control voltage does not become high enough in a range in which the control error is large.

More specifically, while any steering delay of the rear wheels at low speeds does not cause an appreciable problem, such steering delay adversely affects vehicle maneuverability during high-speed travel of the motor vehicle. If a control output for steering the rear wheels were increased so as to eliminate the steering delay thereof, then hunting would take place when the amount of controlling the steering angle is small.

The conventional front and rear wheel steering apparatus therefore fails to sufficiently control some motions since it merely detects effects of driver operations on the motor vehicle behavior and simply controls the rear wheels based on the detected effects, as described above. It has, therefore, been desired in the art to provide sufficient control over all such motions, which have not been controlled well in the past.

SUMMARY OF THE INVENTION

In view of the aforesaid problems of the conventional front and rear wheel steering apparatus, it is an object of the present invention to provide an improved rear wheel control means in a front and rear steering apparatus for new additional control modes.

According to the present invention, there is provided an apparatus for steering the front and rear wheels of a motor vehicle which includes a detecting means for detecting an effect of operation by a driver of the motor vehicle on the behavior of the motor vehicle, and a rear wheel steering control device for returning the rear wheels to a neutral steering position when a rate of change of a detected output from said detecting means is in excess of a prescribed value. The apparatus also includes another control device for variably controlling the ratio of a rear wheel steering angle to a front wheel steering angle according to a speed of the motor vehicle.

The detecting means comprises a steering angle sensor for detecting a steering angle of the front wheels or a speed sensor for detecting the speed of travel of the motor vehicle. The rate of change of the detected output is calculated by said rear wheel steering control device from time-series steering angle data or speed data produced from information generated by said steering angle or speed sensor. The prescribed value to be compared with the rate of change of the steering angle output is substantially the same as a maximum rate of change of a steering angle which can be produced during steering operation of the motor vehicle. The prescribed value to be compared with the rate of change of the speed output is substantially the same as a maximum rate of change of a speed of the motor vehicle which can be produced upon deceleration of the motor vehicle.

The rear wheel steering control device determines the ratio of the rear wheel steering angle to the front wheel steering angle based on an actual vehicle speed when a change in the vehicle speed is in a prescribed range and based on a substitute vehicle speed which is equal to a limit vehicle speed of the prescribed range when a change in the vehicle speed is outside of the prescribed range.

The rear wheel steering control device controls the rear wheel steering angle by selecting the ratio of a motor control output or voltage for steering the rear wheels in response to a control error, to be larger in a range in which the amount of controlling the rear wheel steering angle is larger, than in a range in which the amount of controlling the rear wheel steering angle is smaller.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
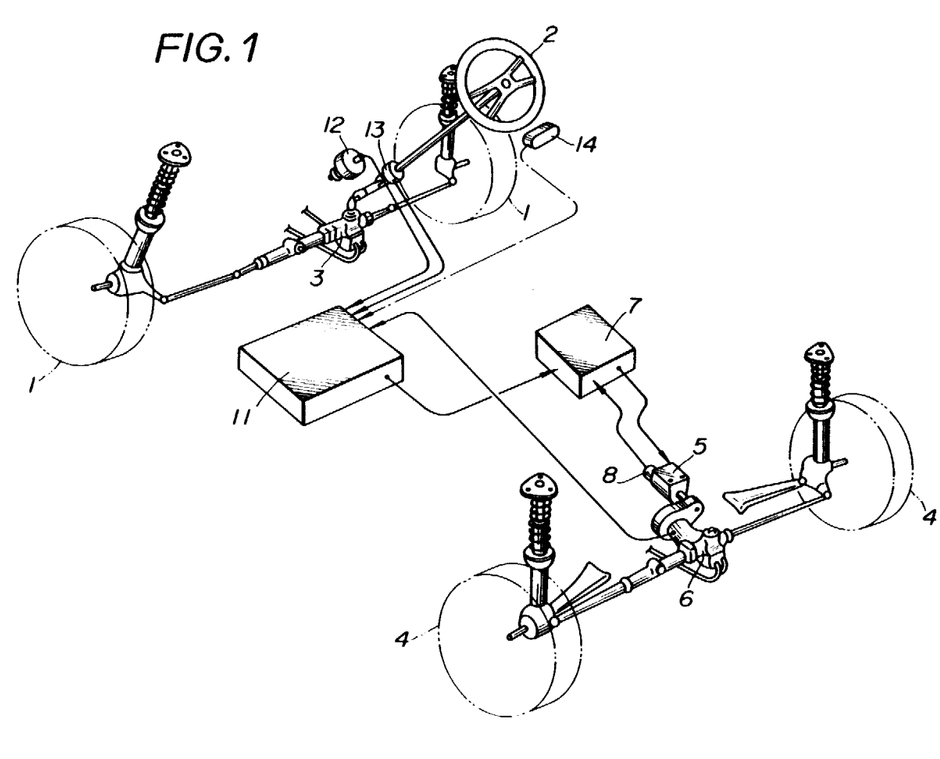
FIG. 1 is a schematic perspective view of an apparatus for steering front and rear wheels according to the present invention.

FIG. 1 schematically shows a front and rear wheel steering apparatus according to the present invention.

As shown in FIG. 1, a motor vehicle such as an automobile has two front wheels 1 steerable by a front power steering device 3 upon turning of a steering wheel 2, and two rear wheels 4 steerable by a rear power steering device 6 driven by a sevomotor 5, which is controlled in its operation by a motor driver 7. A tachogenerator 8 is coupled to the servomotor 5. A control unit 11 is supplied with detected signals from a signal sensor 12 and a front wheel steering angle sensor 13 and applies an output signal representing the ratio of a rear wheel steering angle to a front wheel steering angle and corresponding to the speed of the motor vehicle to the motor drive 7. The control unit 11 is optionally, manually controlled by a selector switch 14 to switch between a 2-wheel-steering mode in which only the front wheels 1 are steerable and a 4-wheel-steering mode in which the front and rear wheels 1, 4 are steerable.

The control unit 11, the motor driver 7, the servomotor 5, the tachogenerator 8, and the rear power steering device 6 jointly constitute a rear wheel control means.

Assuming that a front wheel steering angle is indicated by $\delta_{sw}$ and the vehicle speed is indicated by V, the optimum steering angle $\delta_r$ of the rear wheels 4 is calculated by the control unit 11 as follows:

$$\delta_r = -A \cdot \frac{1 - BV^2}{1 + CV^2} \cdot \delta_{sw} \tag{1}$$

where A, B, C are predetermined constants.

According to the principles of the present invention, the rear wheel control means of the front and rear wheel steering apparatus illustrated in FIG. 1 is improved by adding new control modes to provide sufficient control over various motions effected by the front and rear wheel steering apparatus.

1st embodiment:

According to the first embodiment of the present invention, a steering angle sensor is employed as a means for detecting an effect of operation by the driver on the behavior of the motor vehicle. Whether the steering angle sensor has failed or not is determined on the basis of a rate of change of the detected steering angle (the differential of the steering angle). In the event of a failure of the steering angle sensor, the rear wheels are returned to a neutral steering position.

More specifically, steering angle data values successively delivered from the steering angle sensor 13 to the control unit 11 are successively stored in a memory of the control unit 11 to produce time-series data values, from which a rate of change of the steering angle is calculated. When the steering angle sensor is normal and the detected steering angle varies from a certain angle to another angle, the rate of change of the steering angle is progressively increased from 0 and then reduced to 0 again. When the steering angle sensor fails, the detected steering angle abruptly varies simultaneously with the sensor failure, and immediately becomes zero thereafter.

Therefore, a steering angle sensor failure can be determined by calculating a rate of change of the steering angle (the differential thereof), comparing the calculated rate with a predetermined value, and ascertaining whether the calculated rate exceeds the predetermined value and immediately drops the zero thereafter. The predetermined value should preferably be equal to or slightly larger than a maximum value of the rate of change of the steering angle which can be produced during steering operation.

For example, if the steering angle varies 10° in 0.1 second in the 4-wheel-steering mode regardless of the fact that the steering wheel 2 can only be turned 10° in 1 second, then such steering operation would be impossible, and it can be found that the front wheel steering sensor 13 has failed.

Figure 2:
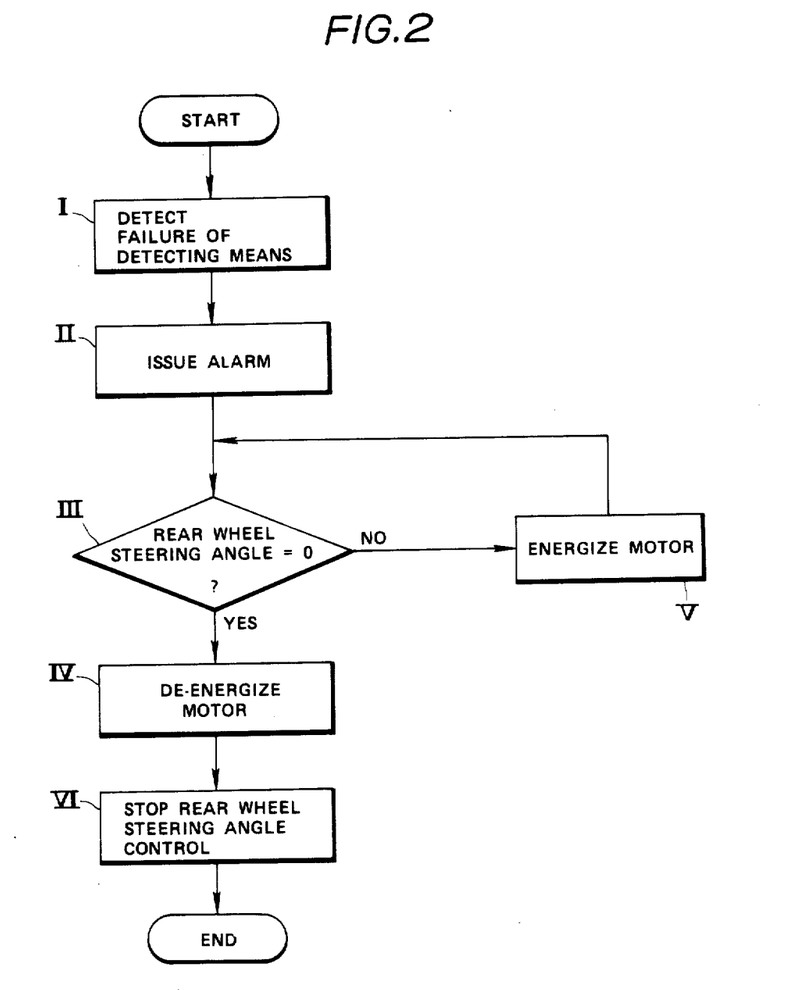
FIG. 2 is a flowchart of rear wheel steering control in the event of a detecting means failure according to first and second embodiments of the invention.

A rear wheel control sequence at the time of a steering angle sensor failure is shown in FIG. 2. When a failure of the steering angle sensor 13 is detected in a step I, an audible or visible alarm is given to the driver in a step II. Then, a step III ascertains whether the rear wheel steering angle is zero or not. If the rear wheel steering angle is zero, then the servomotor 5 is de-energized in a step IV. If the rear wheel steering angle is not zero, then the servomotor 5 is energized in a step V. The servomotor 5 is thereafter de-energized in the step IV when the steering angle becomes zero. The rear wheel steering angle control is stopped in a step VI.

As a consequence, upon a failure of the front wheel steering angle sensor 13, the rear wheel steering angle is kept zero to automatically switch from the 4-wheel-steering mode to the 2-wheel-steering mode.

While the rate of change of the steering angle is calculated in the above embodiment, it may be determined using a graph or chart.

With the first embodiment, a steering angle sensor failure is determined on the basis of a rate of change of the steering angle (the differential thereof), and the rear wheels are returned to the neutral steering position in the event of a steering angle sensor failure. Therefore, a failure of the steering angle sensor can be advantageously detected without adding any new hardware to the steering control apparatus. After a steering angle sensor failure has occurred, the rear wheel steering angle is maintained at zero, and the motor vehicle is automatically switched to the front-wheel steering mode.

2nd embodiment:

In the second embodiment, a speed sensor for detecting the motor vehicle speed is employed as a means for detecting an effect of operation by the driver on the behavior of the motor vehicle. Whether the speed sensor has failed or not is determined on the basis of a rate of change of the detected vehicle speed (the differential of the vehicle speed). In the event of a failure of the speed sensor, the rear wheels are returned to a neutral steering position.

More specifically, speed data values successively delivered from the speed sensor 12 to the control unit 11 are successively stored in a memory of the control unit 11 to produce time-series data values, from which a rate of change of the vehicle speed is calculated. When the speed sensor is normal and the detected motor vehicle speed varies from a certain speed to zero, the vehicle speed is progressively reduced to zero. When the speed sensor fails, the detected vehicle speed abruptly drops to zero simultaneously with the sensor failure.

Therefore, a speed sensor failure can be determined by calculating a rate of change of the vehicle speed (the differential thereof), comparing the calculated rate with a predetermined value, and ascertaining whether the calculated rate exceeds the predetermined value. The predetermined value should preferably be equal to or slightly larger than a maximum value of the rate of change of the vehicle speed which can be produced during brake-induced deceleration.

For example, if the vehicle speed varies from 100 Km/h to 0 Km/h in 0.1 second in the 4-wheel-steering mode regardless of the fact that the vehicle speed can be reduced from 100 Km/h to 0 Km/h in at least 5 seconds as indicated by experimental data, then such deceleration would be impossible, and it can be found that the speed sensor 12 has failed.

A rear wheel control sequence at the time of a speed sensor failure is also effected as shown in FIG. 2. When a failure of the speed sensor 12 is detected in the step I, an audible or visible alarm is given to the driver in the step II. Then, the step III ascertains whether the detected rear wheel steering angle is zero or not. If the detected rear wheel steering angle is zero, then the servomotor 5 is de-energized in the step IV. If the rear wheel steering angle is not zero, then the servomotor 5 is energized in the step V. The servomotor 5 is thereafter de-energized in the step IV when the steering angle becomes zero. The rear wheel steering angle control is stopped in the step VI.

As a consequence, upon a failure of the speed sensor 12, the rear wheel steering angle is kept zero to automatically switch from the 4-wheel-steering mode to the 2-wheel-steering mode.

While the rate of change of the vehicle speed is calculated in the above second embodiment, it may be determined using a graph or chart.

According to the second embodiment, a speed sensor failure is determined on the basis of a rate of change of the vehicle speed (the differential thereof), and the rear wheels are returned on the neutral steering position in the event of a speed sensor failure. Therefore, a failure of the speed sensor can be advantageously detected without adding any new hardware to the steering control apparatus. After a speed sensor failure has occurred, the rear wheel steering angle is maintained at zero, and the motor vehicle is automatically switched to the front-wheel steering mode.

3rd embodiment:

In the third embodiment, a speed sensor for detecting the motor vehicle speed is employed as a means for detecting an effect of operation by the driver on the behavior of the motor vehicle, like the second embodiment. If a change in the vehicle speed as detected by the speed sensor is within a prescribed range, then the ratio of the rear wheel steering angle to the front wheel steering angle is determined on the basis of the actual vehicle speed. If a change in the vehicle speed as detected by the speed sensor is outside of a prescribed range, then the ratio of the rear wheel steering angle to the front wheel steering angle is determined on the basis of a substitute vehicle speed equal to a limit vehicle speed of that prescribed range.

The optimum rear wheel steering angle δr in the equation (i), given above, which corresponds to the vehicle speed V is used as a reference, and limit values of allowable rates of change of the vehicle speed which fall within an allowable range of changes of the rear wheel steering angle are predetermined according to experimental data. Specifically, an upper limit rate (ΔVu) of change of the vehicle speed upon acceleration from a certain vehicle speed Vs and a lower limit rate (ΔVl) of change of the vehicle speed upon deceleration from the vehicle speed Vs are determined in advance.

Figure 3:
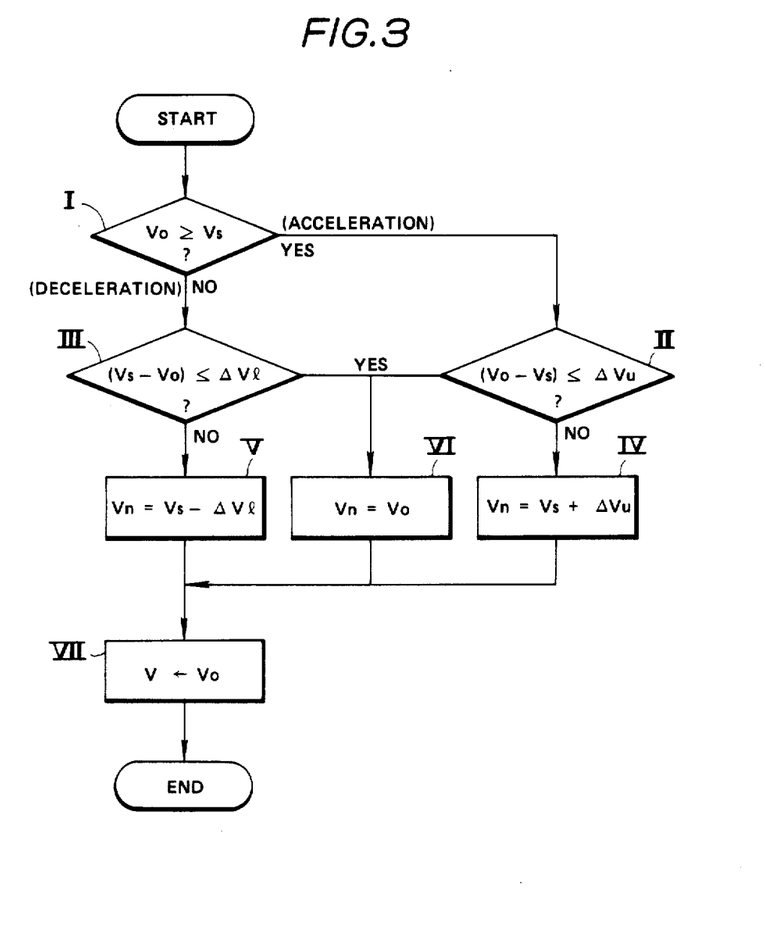
FIG. 3 is a flowchart of a speed substituting process according to a third embodiment of the invention.

FIG. 3 shows a control sequence effected by the control unit 11 for the third embodiment. First, a step I compares the previously measured vehicle speed Vs with the actual (currently) measured vehicle speed Vo. If the motor vehicle runs at a constant speed or is being accelerated, then a step II ascertains whether the difference (Vo−Vs) is equal to or smaller than the rate ΔVu. If the motor vehicle is being decelerated, then a step III ascertains whether the difference (Vs−Vo) is equal to or smaller than ΔVl.

If the speed difference is in excess of the predetermined upper limit rate in the step II, then the vehicle speed is set in a step IV to:

$$Vn = Vs + \Delta Vu$$

If the speed difference is in excess of the predetermined lower limit rate in the step III, then the vehicle speed is set in a step V to:

$$Vn = Vs - \Delta Vl$$

If the speed difference is below the upper and lower limit rates in the steps II, III, then the substitute vehicle speed Vn is set to the actual vehicle speed Vo in a step VI. The equation (i) calculation is then performed on the basis of such substitute vehicle speed Vn in a step VII to determine a rear wheel steering angle.

When the motor vehicle is quickly accelerated from Vs=20 Km/h to Vo=80 Km/h with ΔVu=30 Km/h, for example, the rear wheel steering angle is limited to that at the corrected substitute Vn=50 Km/h. Thus, the rear wheel steering angle is prevented from abruptly varying while the motor vehicle is being steered.

Although the rear wheel steering angle is calculated in the third embodiment, it may be determined using a speed graph or chart.

When a change in the vehicle speed is outside of the predetermined range, the ratio of the rear wheel steering angle to the front wheel steering angle is determined on the basis of a substitute vehicle speed equal to a limit vehicle speed of the predetermined range. Therefore, any change in the rear wheel steering angle is restricted within the allowable range even if the vehicle speed is abruptly varied during steering operation, so that the rear wheel steering angle can be prevented from abruptly varying. The above control process can be advantageously accomplished without adding new hardware to the steering control apparatus. Any abrupt change in the rear wheel steering angle can also be prevented in the event of a speed sensor failure.

4th embodiment:

According to the fourth embodiment, a steering angle sensor is employed as a means for detecting an effect of operation by the driver on the behavior of the motor vehicle, like the first embodiment. When an optimum value for the rear wheel steering angle is determined on the basis of data of the front wheel steering angle from the steering angle sensor, the ratio of a motor control output or voltage for steering the rear wheels to a control error is selected to be larger in a range in which the amount of controlling the rear wheel steering angle is larger, than in a range in which the amount of controlling the rear wheel steering angle is smaller.

Figure 4:
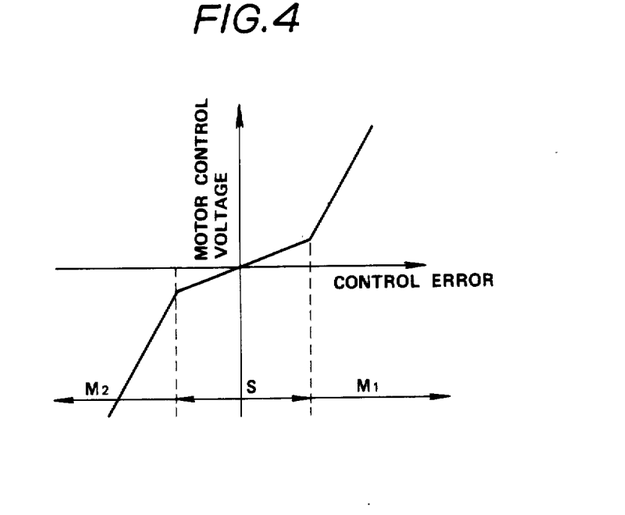
FIG. 4 is a graph showing the relationship between a motor control voltage and a control error according to a fourth embodiment of the invention.

More specifically, the ratio of the control voltage applied to the servomotor 5 to the control error of the rear wheel steering angle is determined by the control unit 11 (FIG. 1) in a pattern as shown in FIG. 4. In a range S in which the control error is smaller, the ratio of the control voltage to the control error, i.e., the gradient of the control voltage, is made smaller to prevent hunting from occurring. In ranges M1, M2 in which the control error is larger, the gradient of the control voltage is made larger for increasing a control speed. The steering of the rear wheels is controlled according to the graph shown in FIG. 4.

Figure 5:
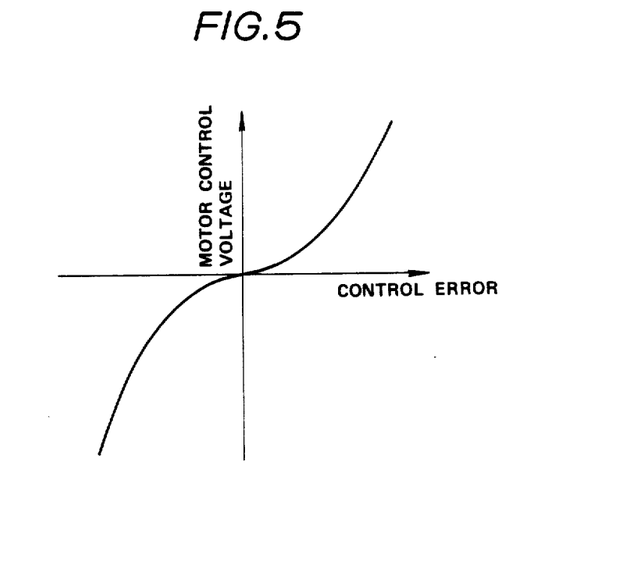
FIG. 5 is a graph showing the relationship between a motor control voltage and a control error according to a modification of the fourth embodiment.

FIG. 5 shows a smoother curve of the control voltage gradient in which no sharp changes are present in the control voltage between the ranges S, M1, M2. The steering of the rear wheels may be controlled according to the graph shown in FIG. 5.

With the fourth embodiment, in the range in which the amount of controlling the rear wheel steering angle is smaller, the ratio of the control output or voltage to the control error is smaller for the prevention of hunting. In the range in which the amount of controlling the rear wheel steering angle is larger, the ratio of the control output or voltage to the control error is larger for an increased control speed. Consequently, the rear wheel steering control can quickly be carried out at larger control errors and without causing hunting at smaller control errors.

The front and rear wheel steering control apparatus of the present invention may incorporate any or all of the foregoing four embodiments.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. An apparatus for steering the front and rear wheels of a motor vehicle, comprising:
   detecting means for detecting an effect of operation by a driver of the motor vehicle on the behavior of the motor vehicle; and
   a rear wheel steering control device for returning the rear wheels to a neutral steering position when a rate of change of a detected output from said detecting means is in excess of a prescribed value.

2. An apparatus according to claim 1, further including another control device for variably controlling the ratio of a rear wheel steering angle to a front wheel steering angle according to a speed of the motor vehicle.

3. An apparatus according to claim 2, wherein said detecting means comprises a steering angle sensor for detecting a steering angle of the front wheels.

4. An apparatus according to claim 3, wherein said rate of change of the detected output is calculated by said rear wheel steering control device from time-series steering angle data produced from information generated by said steering angle sensor.

5. An apparatus according to claim 4, wherein said prescribed value is substantially the same as a maximum rate of change of a steering angle which can be produced during steering operation of the motor vehicle.

6. An apparatus to claim 2, wherein said detecting means comprises a speed sensor for detecting the speed of travel of the motor vehicle.

7. An apparatus according to claim 6, wherein said rate of change of the detected output is calculated by said rear wheel steering control device from time-series speed data produced from information generated by said speed sensor.

8. An apparatus according to claim 7, wherein said prescribed value is substantially the same as a maximum rate of change of a speed of the motor vehicle which can be produced upon deceleration of the motor vehicle.

* * * * *

UNITED STATES PATENT AND TRADEMARK OFFICE
CERTIFICATE OF CORRECTION

PATENT NO. : 4,716,981
DATED : January 5, 1988
INVENTOR(S) : Eiji Murao et al.

It is certified that error appears in the above-identified patent and that said Letters Patent is hereby corrected as shown below:

```
Column 1, line 58, change "detecting" to --detect--.
Column 4, line 26, change "sevomotor" to --servomotor--;
          line 30, change "signal" to --speed--;
          line 34, change "drive" to --driver--;
Column 5, line 19, after "drops" change "the" to --to--.
Column 6, line 52, change "on" to --to--.
```

Signed and Sealed this

Seventh Day of June, 1988

Attest:

DONALD J. QUIGG

*Attesting Officer*  *Commissioner of Patents and Trademarks*